Oct. 9, 1962 W. D. CLOSE 3,057,157
ROTARY ENGINE
Filed Oct. 8, 1959 3 Sheets-Sheet 1

INVENTOR.
William D. Close
BY
Graf, Nierman & Burmeister
Attorneys

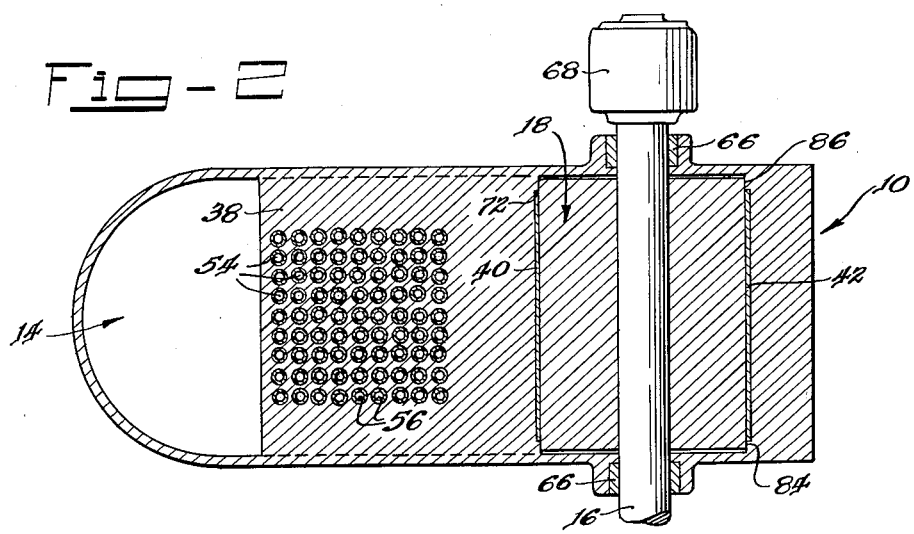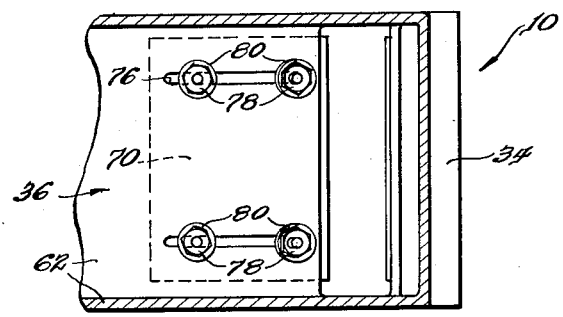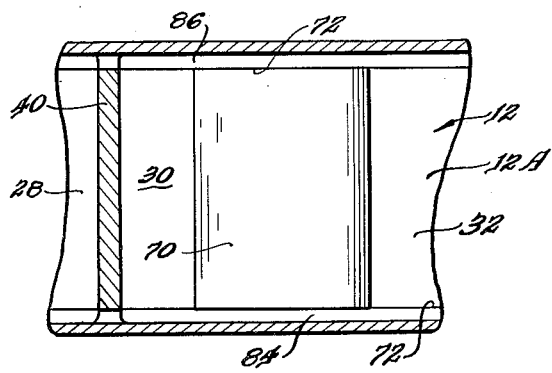

Oct. 9, 1962 W. D. CLOSE 3,057,157
ROTARY ENGINE
Filed Oct. 8, 1959 3 Sheets-Sheet 3
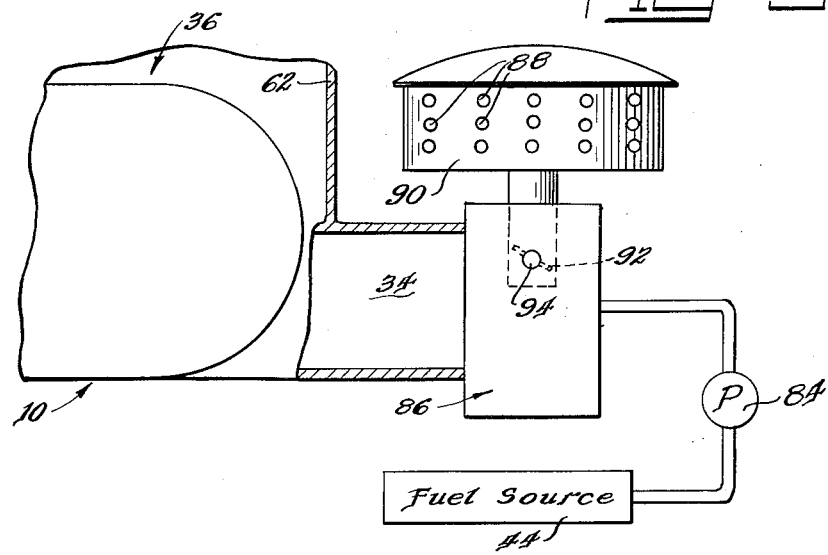
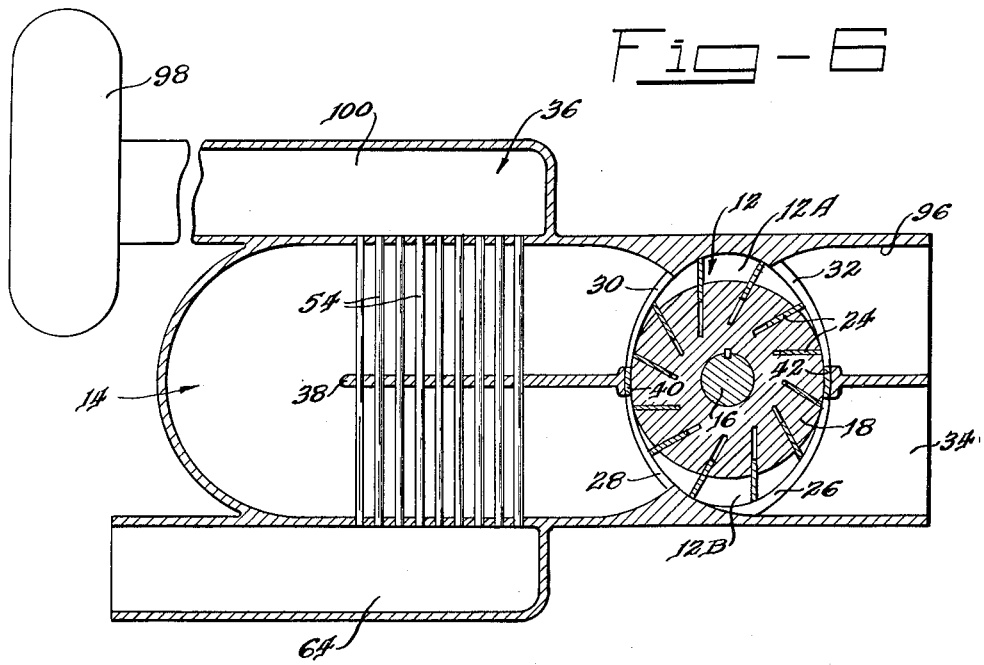
INVENTOR.
William D. Close
BY
Graf, Nierman & Burmeister
Attorneys

United States Patent Office 3,057,157
Patented Oct. 9, 1962

3,057,157
ROTARY ENGINE
William D. Close, Glencoe, Ill.
(1018 N. Cedar Road, New Lennox, Ill.)
Filed Oct. 8, 1959, Ser. No. 845,109
8 Claims. (Cl. 60—39.63)

The present invention relates generally to rotary engines of the vane type. The invention contemplates rotary engines of the internal combustion type and external combusiton type, and particularly continuous combustion engines.

There have been efforts in the past to provide rotary engine, the Patent No. 2,476,396 to Woldemar A. Bary entitled "Rotary Engine or Compressor" being an example. In this patent, Bary discloses the combination of a rotary pressure to torque convertor, a rotary compressor, and a combustor connected between the compressor and the convertor. Both the compressor and the rotary convertor are similar in principle of operation, design and construction, and consists of a cylindrical rotor with an even number of sliding vanes revolving in a non-cylindrical stationary shell, with a multiple odd number of compression or expansion chambers working in parallel.

It is one of the objects of the present invention to provide a rotary engine which employs a common vane type rotor for both the compressor and convertor. By combining the compressor and convertor of a rotary engine into a single assembly, the size and weight per unit torque and horsepower developed are held to a minimum.

It is also an object of the present invention to provide a rotary engine with a constant pressure exerted on the rotor of the engine during operation to minimize vibration, produce steady power, assure quiet operation, and operate efficiently over a wide range of speeds.

It is a further object of the present invention to provide a rotary engine with means for utilizing the exhaust heat from the engine in order to improve the economy of engine operation.

The inventor achieves the foregoing objects of his invention providing a rotary engine with a single vane type rotor which is connected to an expansion chamber by two ports spaced from each other and confronting the rotor. An equal pressure is applied to two vanes of the rotor from pressurized gases passing through the ports from the expansion chamber, and the two two torques exerted on the rotor by the gases are in opposite directions. However, the casing or housing for the rotor is non-cylindrical and proportioned so that the torque resulting from pressure on a greater area of one of the vanes of the rotor relative to the other torque results in rotation of the rotor.

Further objects and advantages of the present invention will be readily apparent to those skilled in the art upon a further reading of this disclosure, particularly when viewed in the light of the drawings, in which:

FIGURE 2 is a sectional view of the rotary engine taken along the line 2—2 of FIGURE 1;

FIGURE 3 is a sectional view of the rotary engine taken along the line 3—3 of FIGURE 1;

FIGURE 4 is a sectional view of the rotary engine taken along the line 4—4 of FIGURE 1;

FIGURE 5 is a fragmentary view of a modified construction of the rotary engine illustrated in FIGURES 1 through 4; and FIGURE 6 is a vertical axial sectional view of an external combustion engine constructed according to the teachings of the present invention.

Figure 1:
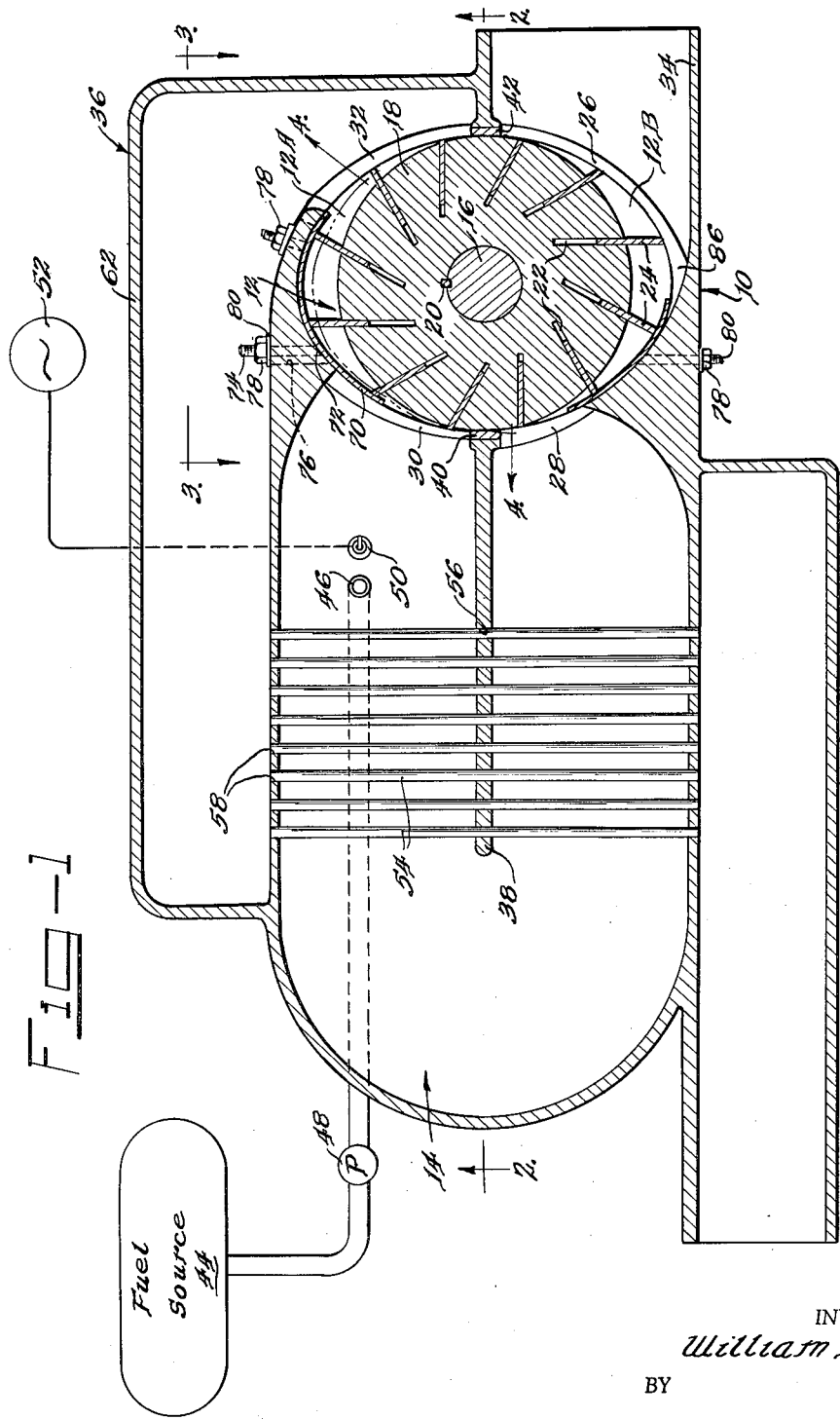
FIGURE 1 is a vertical axial sectional view of an internal combustion rotary engine constructed according to the teachings of the present invention.

FIGURES 1 through 4 illustrate an internal combustion engine which has a housing 10 containing a work cavity 12 and an expansion or combustion chamber 14. The work cavity 12 has a surface parallel to an axis thereof and non-cylindrical about the axis, and a shaft 16 is disposed on the axis. A rotor 18 which has a cylindrical cross section is secured coaxially to the shaft 16 by a key 20, and the rotor is provided with a plurality of slots 22 which extend therein parallel to the axis. Each of the slots 22 have parallel walls, and accommodate a plate shaped piston vane 24 which is slidedly disposed within the slots. The ends of the vanes opposite the rotor 18 slidably abut the wall of the work cavity 12, and form a seal therewith.

The housing 10 is provided with four ports 26, 28, 30, and 32 communicating with the work cavity 12. The first of these ports 26 confronts a tubular portion 34 of the housing 10 which communicates with the ambient atmosphere. The second of these ports 28 is disposed between the work cavity 12 and the combustion chamber 14. As illustrated, the rotor is adapted to rotate in a clockwise direction, and the port 28 is upstream from the port 26. The third port 30 is upstream from the port 28, and also communicates with the combustion chamber. The fourth port 32 is disposed between the third port 30 and the first port 26 and communicates with an exhaust system generally designated 36.

The combustion chamber 14 is provided with a partition plate 38 which extends from between the ports 28 and 30 on the exterior surface of the portion of the housing defining the work cavity 12 along the axis of the combustion chamber 14 and generally parallel to the axis of the rotor 18. The partition plate 38 is spaced from the end of the combustion chamber 14 opposite the rotor 18, so that gases freely pass around the end of the partition plate. A wiper 40 is disposed between the second port 28 and the third port 30 between the rotor 18 and the confronting surface of the work cavity 12. In like manner, a second wiper 42 is disposed on the surface of the work cavity 12 in sliding contact with the surface of the rotor 18 between the fourth port 32 and the first port 26. The purpose of the wipers 40 and 42 is to assure a fluid tight seal at these points of the rotor 18.

A fuel source 44 is connected to a nozzle 46 disposed in the wall of the combustion chamber 14 through a pump 48. The nozzle 46 produces a continuous spray of combustible fuel from the source 44 into the combustion chamber 14. An ignition means in the form of a spark gap 50 is also mounted in the wall of the combustion chamber 14, and the spark gap 50 is electrically connected to an electrical pulse generator 52 which produces a spark across the gap 50 to ignite the fuel injected into the bustion chamber. The location of both the nozzle 46 and the spark gap 50 in the combustion chamber 14 is not critical, however, the distance from the spark gap 50 to the third port 30 must be sufficient to allow time to complete burning of the fuel.

The exhaust system 36 is disposed between a fourth port 32 and the ambient atmosphere. It includes a plurality of hollow tubes 54 which extend through the combustion chamber 14 normal to the partition plate 38 and through apertures designated 56 in the partition plate 38. The tubes 54 also pierce opposite walls of the combustion chamber through apertures 58 and 60, respectively, and with the combustion chamber 14 constitute a reverse flow heat exchanger. An air tight shell 62 is sealed to the housing and encloses the apertures 58 and the port 32 so that exhaust leaving the work cavity 12 through the port 32 is directed to the tubes 54. A manifold 64 is also sealed to the housing 10 about the apertures 60 to discharge exhaust passing through the tubes to the ambient atmosphere.

As indicated in FIGURE 2, the shaft 16 extends through the housing 10 and is journaled therein on bearings 66.

One end of the shaft 16 is connected to a starter 68 which may be an electric motor.

The starter 68 is necessary to start the engine into operation, and on energization sets the rotor 18 in clockwise rotation. The action of the rotor compresses air passing through the tube 34 and delivers it into the combustion chamber 14 where it is mixed with the fuel entering through the nozzle 46. The mixture of fuel and air is ignited by the spark gap 50 resulting in the generation of heat and rapid expansion of gases within the combustion chamber 14. The pressurized gases pass through the second and third ports 28 and 30 and submit the confronting vanes 24 of the rotor 18 to equal and oppositely directed pressures. However, since the portion of the work cavity 12 confronting the port 30 is of larger volume, that is the distance between the wall of the cavity and the surface of the rotor is greater in the region confronting the port 30 than it is in the region confronting the second port 28, the total force exerted on the rotor 18 by the gases passing through the port 30 exceeds the total force exerted on the rotor by the gases passing through the port 28. This is due to the fact that a larger area of vane is subjected to the pressure of the gases confronting the port 30 than confronting the port 28 and also due to the fact that the lever arm through which the vanes confronting the port 30 operate exceeds that of the lever arm of the vanes confronting the port 28. As a result, the clockwise rotation of the rotor is reinforced. The rotation of the rotor sweeps the exhaust from the work cavity through the port 32, and compresses ambient air entering through the port 28. The exhaust gases exiting from the work cavity 12 through the fourth port 32 are utilized to expand gases in the combustion chamber since they flow through the tubes 54 which constitute a heat exchanger to the gases within the combustion chamber 14. Once the rotor commences to rotate, it is not necessary to operate the starter motor 68, and it may be deenergized.

It is to be noted that the wipers 40 and 42 essentially divide the work cavity 12 into two portions which have been designated 12A and 12B. Also, immediately adjacent to each of the wipers 40 and 42, the volume of the cavities 12A and 12B approaches zero. Progressing from the wipers 40 and 42, each of the cavities 12A and 12B has an increasing volume, but the cavity 12B between the third and fourth ports 30 and 32 increases at a more rapid rate for equal displacements around the circumference of the rotor. Hence, a vane 24 confronting the second port 28 and at an angular position relative to the wiper 40 is extended a much shorter distance than a vane confronting the port 30 at the same angular position relative to the wiper 40, the term extended referring to the distance that the vane 24 has slid from the slot 22 in the rotor. The relative extension of the vanes under these two conditions is determined by Boyle's law for maximum efficiency, that is, the ratio of the maximum extension of the vanes approaching the second port 28 to the maximum extension of the vanes departing from the third port 30 should be the same as the ratio of the absolute temperature of the air entering the second port 28 to the absolute temperature of the gases passing through the third port 30.

It is also true that the ratio of the cross-sectional area of the port 28 to the cross-sectional area of the port 30 should be approximately the same as the absolute temperature of the gases entering through the port 28 to the absolute temperature of the gases emerging from the port 30. For this reason, both the second port 28 and the third port 30 are made adjustable. A plate 70 having the radius of curvature of the wall of the work cavity 12B is disposed within a slot 72 of the wall, and is translatable therein. The plate 70 may be translated toward the wiper 40, as best illustrated in FIGURE 4, to reduce the size of the opening for the third port 30, or it may be translated away from the wiper 40 to increase the size of the third port 30. Since the port 30 terminates adjacent to the wiper 40, and the volume of the cavity 12B approaches zero at the wiper 40, it is only necessary to control the edge of the port 30 opposite the wiper 40. The plate 70 is anchored in position by bolts 74 which extend outwardly from the plate 70 through a slot 76 disposed normal to the axis of the rotor 18, and a lock nut 78 which compresses a washer 80 against the housing 10. Two locking mechanisms of this type are provided for the plate 70. Similar constructions are provided for restricting the size of the port 28 in order to provide the proper ratio of areas between the second port 28 and the third port 30.

The first port 26, as illustrated, is not provided with any means for restricting its cross-sectional area, because it is desired in this embodiment to provide free access for the ambient atmosphere entering into the cavity 12B. The fourth port is designed to provide the maximum compression region in the cavity 12A without recompression occurring.

It is to be noted that the vanes 24 extend completely across the cavity 12, but that the ports 26, 28, 30, and 32 do not extend to the cavity walls but provide a region confronting the ends of the vanes designated 84 and 86 to guide the vanes about the cavity 12. Also, the vanes 24 are not disposed on radii of the rotor 18. The vanes 24 lead the radii of the rotor 18 for the purpose of reducing the component of the centrifugal force driving the vanes 24 against the wall of the work chamber 12 and also to align the force vector with the slot 22 when retracting the vanes. As illustrated, the vanes 24 are approximately 30 degrees ahead of the radii of the rotor.

FIGURE 5 illustrates a modification of the engine shown in FIGURES 1 through 4. In the engine of FIGURE 5, the fuel is connected to the engine from the source 44 through a pump 84 connected to the tube 34 of the engine. It is to be understood that other portions of the engine are as illustrated in FIGURES 1 through 4 and described above.

The carburetor has an air intake in the form of a plurality of openings 88 in a dust filter cover 90 and has an internal valve 92 for controlling the flow of air into the carburetor 86. The valve 92 is controlled by a shaft, illustrated at 94, in the manner of conventional engines.

FIGURE 6 illustrates a modification of the present invention to apply the teachings of the present invention to external combustion engines. As used in the present specification, combustion within the combustion chamber is considered internal combustion, while combustion exterior thereto is external, and not with regard to whether the combustion occurs within the work chamber 12.

In FIGURE 6, the rotor 18, work chamber 12, and expansion chamber 14 are identical to that illustrated in FIGURES 1 through 4, and the same reference numerals will be used to designate these parts. The engine, of course has no fuel or ignition system.

The fourth port 32 is no longer connected to an exhaust system, although it is to be understood that the heat of the exhaust leaving the engine through this port can be utilized in any of the conventional manners. The fourth port 32 is connected to the ambient atmosphere through an exhaust tube 96. A steam source 98 is connected to a manifold 100 connected to each of the tubes 54, and the manifold 64 connected to the opposite end of the tubes 54 serves to conduct the spent steam from the tubes. The spent steam may be exhausted to the ambient atmosphere or utilized in a conventional manner.

Air is compressed in the expansion chamber 14 as a result of passing through work chamber 12B from the port 26. In the expansion chamber, the air is heated by the steam flowing through the tubes 54, and expands. The expanded air then drives the rotor in the manner indicated above.

While steam has been set forth as the heat medium for expanding the air within the expansion chamber 14, it is to be understood that heated gases may also be utilized for this purpose. Further, the tube 34 may be connected to a source of some other fluid than the atmosphere if desired.

The rotary engine may be operated as a steam engine by connecting the tube 34 to a source of water, and passing hot gases through the tubes 54 with sufficient heat to vaporize the water within the expansion chamber. In order to introduce water into the engine, the portion 12B of the work chamber must have a constant volume, since water will not compress. The exhaust steam from the tube 96 may be utilized to preheat the water in the conventional manner.

It is also to be noted that water may be injected into the tube 34 of the engine of FIGURES 1 through 4 in small quantities in order to improve the efficiency of the engine and lower the operating temperature of the engine.

The selection of materials used for the engine is determined by the temperature of operation of the engine. For temperatures up to about 500 degrees Fahrenheit, the housing 10 may be constructed of aluminum, but for higher temperatures stainless steel may be used. The vanes 24 may be fabricated of Stellite.

It is to be noted that the engine produces essentially constant power. The spark gap, illustrated in FIGURES 1 through 4, produces initial combustion in the expansion chamber 14, and burning of the air-fuel mixture in the combustion chamber 14 is thereafter continuous. If desired, the spark gap may be deactivated, or may be permitted to provide a spark to reignite the mixture in the event of flame out. As a result of the continuous power provided by the engine, vibrations are substantially reduced, and it is not necessary to overrate materials in the manner of intermittent power producing machines.

From the foregoing disclosure, those skilled in the art will readily devise many modifications and improvements of rotary engines which are within the present inventive concept. It is therefore intended that the present invention be not limited by the foregoing disclosure, but rather only by the appended claims.

The invention claimed is:

1. A rotary engine comprising a housing having an expansion chamber therein and a work cavity symmetrically disposed about an axis, said housing having four open spaced ports consecutively disposed about the axis of the work cavity, the first of said ports extending between the work cavity and the ambient atmosphere, the second and third of said ports connecting the expansion chamber and the work cavity the fourth of said ports being adapted for connection to an exhaust system, and the expansion chamber having a partition extending from the surface of the chamber between the second and third ports and terminating at a distance from the surface opposite the work cavity, a rotor disposed in the work cavity having a plurality of piston vanes disposed at spaced intervals about the axis thereof and extending therefrom slidably engaging the walls of the work cavity, the volume of the portion of the work cavity disposed between the rotor and confronting surface of the work cavity being greater adjacent to the third port than adjacent to the second port, an oxygen containing gas source coupled to the first port, a first wiper disposed parallel to the axis of the rotor mounted on the surface of the work cavity between the second and third ports in slidable engagement with the rotor, a second wiper disposed parallel to the axis of the rotor on the surface of the work cavity between the first and fourth ports in slidable engagement with the rotor, and means for injecting a burnable fuel into the expansion chamber and for igniting the fuel therein, whereby pressure exerted on the rotor by the exhaust gases from the expansion chamber results in rotation of the rotor and exhaust of the gases from the fourth port.

2. A rotary engine comprising the elements of claim 1 in combination with means for adjusting the cross-sectional areas of the second and third ports.

3. A rotary engine comprising a housing having an expansion chamber therein and a work cavity, said housing having four open spaced ports disposed about the axis of the work cavity, the first of said ports extending between the work cavity and the ambient atmosphere, the second and third ports connecting the expansion chamber and the work cavity the fourth of said ports being adapted for connection to an exhaust system, and the expansion chamber having a partition extending from the surface of the chamber between the second and third ports and terminating at a distance from the surface opposite the work cavity, a rotor disposed in the work cavity having a plurality of piston vanes disposed at spaced intervals about the axis thereof and extending therefrom slidably engaging the walls of the work cavity, the volume of the portion of the work cavity disposed between the rotor and confronting tsurface of the work cavity being greater adjacent to the third port than adjacent to the second port, and the cross-sectional area of the portion of the work cavity between the first and second ports being constant.

4. A rotary engine comprising the elements of claim 1 in combination with a plurality of parallel hollow tubes extending through the expansion chamber, and a gas impermeable shell sealed to the housing coupling the fourth port to one end of each of the tubes.

5. A rotary engine comprising the elements of claim 1 wherein the means for injecting a burnable fuel into the expansion chamber comprises a source of liquid burnable fuel, a spray nozzle mounted in the wall of the expansion chamber, and a pump connected between the spray nozzle and the source of liquid fuel.

6. A rotary engine comprising the elements of claim 1 wherein the means for injecting a burnable fuel into the expansion chamber comprises a source of liquid fuel, a carburetor connected to the first port, and a pump connected between the fuel source and the carburetor.

7. A rotary engine comprising a housing having an expansion chamber therein and a work cavity being connected to the expansion chamber by a first and a second spaced port, a rotor disposed in said work cavity having piston vanes extending therefrom slidably engaging the walls of the work cavity, pressurized fluid from the expansion chamber exerting equal pressure in opposite directions on the vanes of the rotor adjacent to the first and second ports, the vanes adjacent to the second port presenting greater area to pressurized fluids from the expansion chamber than the vanes adjacent to the first port resulting in a torque impressed on the rotor, wherein the rotor is provided with a plurality of slots extending therein parallel to the axis thereof, a piston vane slidably disposed in each of the slots abutting the surface of the work cavity, said cavity having a pair of outwardly extending guide rims on the surface of the cavity adjacent to the ends of the rotor, the vanes slidably engaging the guide rims.

8. A rotary engine comprising a housing having an expansion chamber therein and a work cavity, said housing having four open spaced ports disclosed about the axis of the work cavity, the first of said ports extending between the work cavity and the ambient atmosphere, the second and third ports connecting the expansion chamber and the work cavity the fourth of said ports being adapted for connection to an exhaust system, and the expansion chamber being provided with a partition extending from the surface of the chamber between the second and third ports and terminating at a distance from the surface thereof opposite the work cavity, a plurality of parallel hollow tubes extending through the expansion chamber, a rotor disposed in the work cavity on the axis thereof having a plurality of piston vanes disposed at spaced intervals about the axis thereof and extending therefrom and slidably engaging the walls of the work cavity, the first and fourth ports of the housing communicating with the ambient atmosphere, a source of high temperature fluid connected with one end of each of the tubes, the other end of the tubes being connected to an exhaust system, whereby ambient atmosphere introduced through the first port is pumped into the expansion chamber and expanded by the heat liberated from the tubes extending through the expansion chamber to drive the rotor.

References Cited in the file of this patent

UNITED STATES PATENTS

| | | |
|---|---|---|
| 1,069,424 | Hopkins | Aug. 5, 1913 |
| 1,427,053 | Bidwell | Aug. 22, 1922 |
| 2,197,492 | Dodge | Apr. 16, 1940 |
| 2,248,639 | Miksits | July 8, 1941 |
| 2,591,540 | Grylls | Apr. 1, 1952 |
| 2,789,415 | Motsinger | Apr. 23, 1957 |

FOREIGN PATENTS

| | | |
|---|---|---|
| 561,766 | Germany | Oct. 18, 1932 |
| 468,390 | Great Britain | July 2, 1937 |